United States Patent [19]

Hatta

[11] Patent Number: 4,576,413
[45] Date of Patent: Mar. 18, 1986

[54] HEAD-REST INCLUDING A DEVICE TO PERMIT PIVOTAL ADJUSTMENT THEREOF RELATIVE TO A VEHICLE SEAT

[75] Inventor: Susumu Hatta, Akishima, Japan
[73] Assignee: Tachikawa Spring Co. Ltd., Japan
[21] Appl. No.: 583,031
[22] Filed: Feb. 23, 1984
[51] Int. Cl.⁴ .............................................. A47C 7/36
[52] U.S. Cl. ..................................... 297/408; 297/391
[58] Field of Search ............... 297/391, 408, 409, 404, 297/403, 410, 356, 367; 74/529, 534, 533

[56] References Cited

U.S. PATENT DOCUMENTS

| | | | |
|---|---|---|---|
| 777,745 | 12/1904 | Pavlish | 297/356 X |
| 1,039,414 | 9/1912 | Koken | 297/410 |
| 2,830,653 | 4/1958 | Gaugler | 297/356 X |
| 2,942,705 | 6/1960 | Payne | 74/529 X |
| 3,273,418 | 9/1966 | Ellis | 74/529 X |
| 3,547,486 | 12/1970 | Herzer | 297/408 |
| 4,304,439 | 12/1981 | Terada et al. | 297/409 |
| 4,370,898 | 2/1983 | Maruyama | 297/408 X |

*Primary Examiner*—William E. Lyddane
*Assistant Examiner*—José V. Chen
*Attorney, Agent, or Firm*—Cushman, Darby & Cushman

[57] ABSTRACT

A head-rest for a vehicle seat is disclosed which is mounted to a seat back frame in such a manner as to be free to rotate longitudinally of the vehicle. Support members for supporting the head-rest and a lock plate formed with a large number of locking grooves are fixed to a shaft of rotation provided between two brackets. The lock plate is rotated with the longitudinal movement of the head-rest and a stopper provided in the bracket is engaged into one of the locking grooves in the lock plate so that the head-rest is locked in its desired position.

10 Claims, 9 Drawing Figures

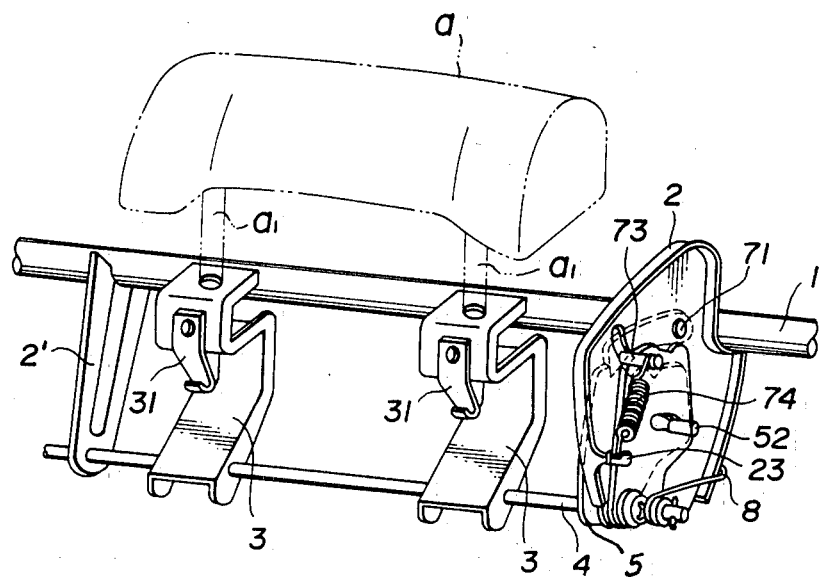
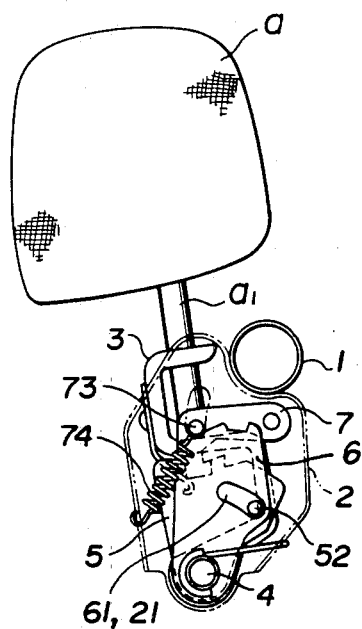
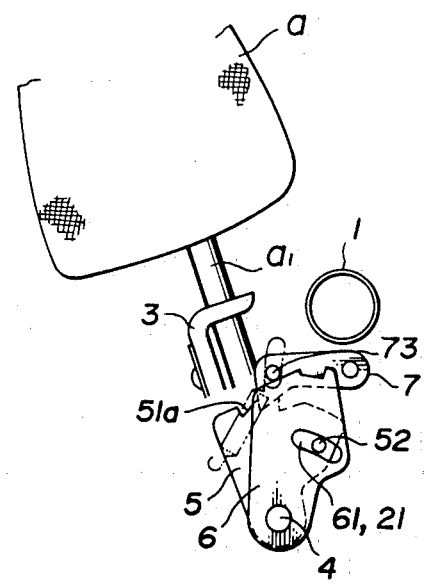

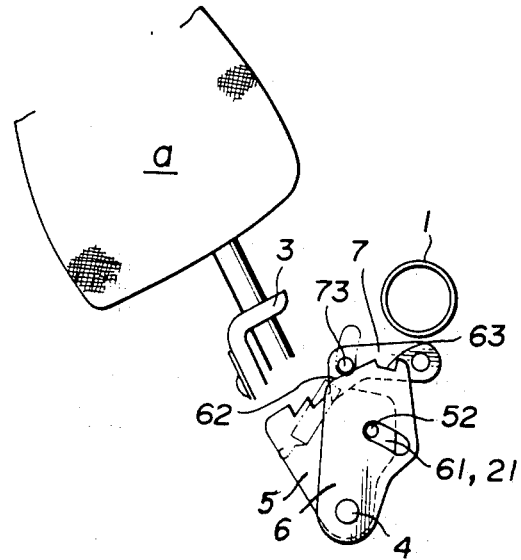
FIG. 5(C)
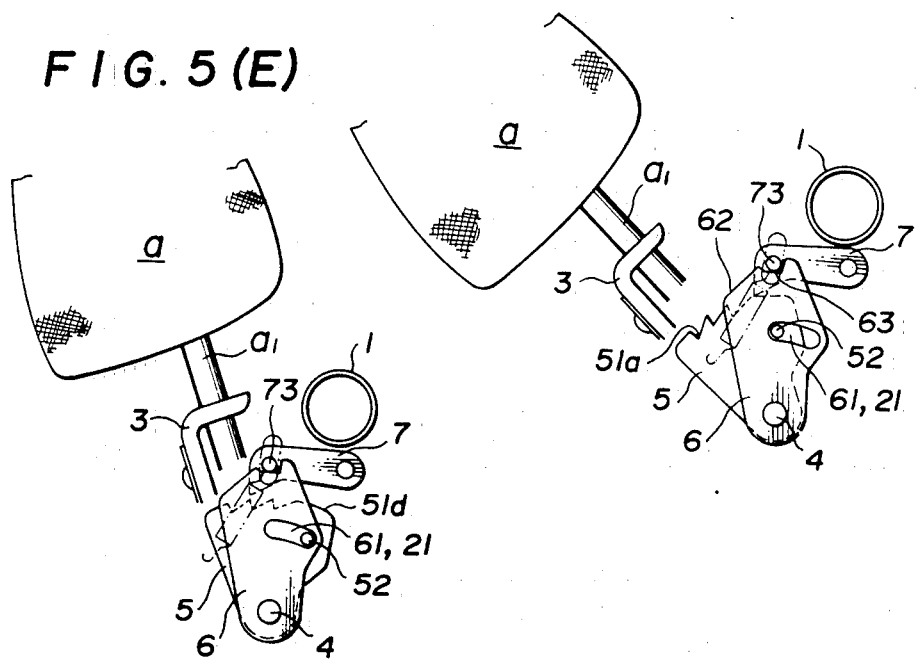
FIG. 5(D)
FIG. 5(E)

HEAD-REST INCLUDING A DEVICE TO PERMIT PIVOTAL ADJUSTMENT THEREOF RELATIVE TO A VEHICLE SEAT

BACKGROUND OF THE INVENTION

1. Field of the Invention

The present invention relates to a new and improved head-rest for seats to be used in vehicles and, more particularly, to head-rests in which the head-rest stays are rotatably mounted to a seat back frame so that the head-rest is capable of movement longitudinally of the vehicle for its positional adjustments.

2. Description of the Prior Art

One of the conventional head-rests of this type is illustrated in FIG. 1.

Such a conventional head-rest comprises two brackets (2′) respectively fixed to seat back frames (1′)(1′) longitudinally and a pair of arms (3′)(3′); for supporting a head-rest body (a). A pin (3b′) for determining or positioning the longitudinal position of the head-rest body (a) is provided laterally of the upper portions of the pair of arms (3′)(3′), and a pin (3a′) serving as a fulcrum or center of rotation is provided laterally of the lower portions thereof. When the pins (3b′) and (3a′) are inserted into a corrugated lock port (2b′) formed in the bracket (2′) and an elongated bore (2a′) of the bracket (2′), respectively, the head-rest body (a) is rotated about the pin (3a′) in a longitudinal direction and the pin (3b′) is engaged at a desired position within the locking port (2b′) so as to complete the locking of the head-rest. Therefore, although the rotational movement of the head-rest body (a) about the pin (3a′) increases the range of the longitudinal movement of the head-rest body (a), the longitudinal movement of the head-rest body (a) will also give rise to vertical displacement of the pins (3a′)(3b′) so that the head-rest varies in height according to its logitudinal positions. That is, in the prior art head-rest of FIG. 1, it is necessary to adjust the height of the head-rest after its longitudinal, positional adjustment.

SUMMARY OF THE INVENTION

Accordingly, the main object of the present invention is to provide a head-rest which eliminates the problem associated with the conventional head-rest as mentioned above. In particular, the present invention provides a head-rest which is capable of longitudinal movement without causing any changes in its height.

In order to achieve this object, according to the invention, support members for supporting a head-rest body and a locking plate formed with a large number of locking grooves are fixedly mounted to a shaft of rotation extended between two brackets, whereby the locking plate is rotated with the longitudinal movement of the head-rest body and a stopper provided in the bracket is engaged into one of the locking grooves in the locking plate which is located at a desired position.

Thus, according to the invention, since the head-rest body can be moved forwardly and rearwardly, or, longitudinally of a vehicle in which the head-rest is employed, without shifting in its vertical direction as in the above-mentioned prior art head-rest, there is no need for its vertical adjustment after it is adjusted longitudinally. In other words, since the head-rest body is rotated about a shaft of rotation located within a seat back, the present invention can eliminate the above-mentioned problem in the conventional head-rest without impairing the advantage of a wide range of adjustments of longitudinal movements that is present in the prior art head-rest.

BRIEF DESCRIPTION OF THE DRAWINGS

The invention will be further explained with reference to the drawings illustrating a preferred embodiment of the invention.

FIG. 3 is a perspective view of the main portions of the head-rest of the invention;

FIGS. 5(A) through (E) are respectively partially broken side views, illustrating the operation of the head-rest according to the present invention.

DETAILED DESCRIPTION OF A PREFERRED EMBODIMENT OF THE PRESENT INVENTION

Figure 1:
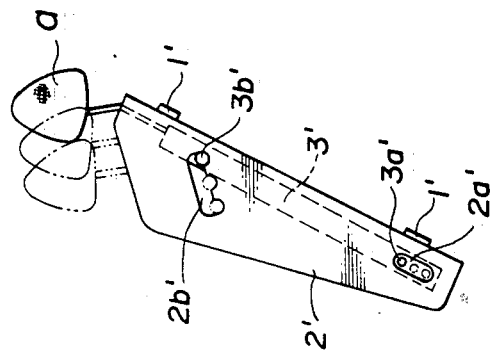
FIG. 1 is a side elevation illustrating a conventional head-rest.
Figure 2:
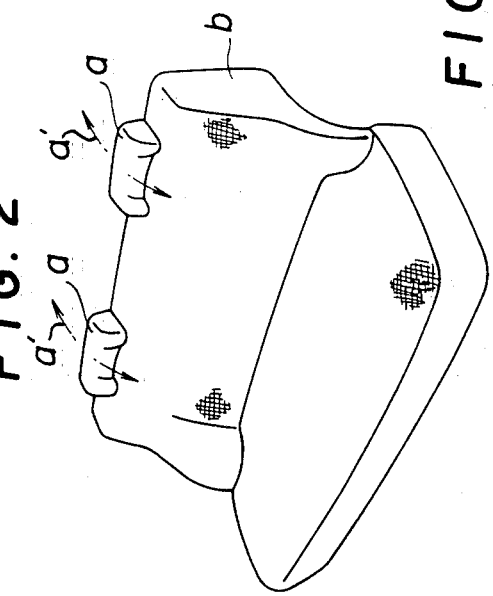
FIG. 2 is a perspective view of a head-rest constructed in accordance with the present invention, illustrating the using condition of the head-rest of the invention.

FIG. 2 illustrates a vehicle seat employing a head-rest constructed in accordance with the present invention. In this figure, (a) designates a head-rest body and (b) represents a seat back. The head-rest body (a) is mounted to the top portion of the seat back (b) such that it can be moved longitudinally (arrows a′) of the vehicle for its positional adjustment.

Figure 4:
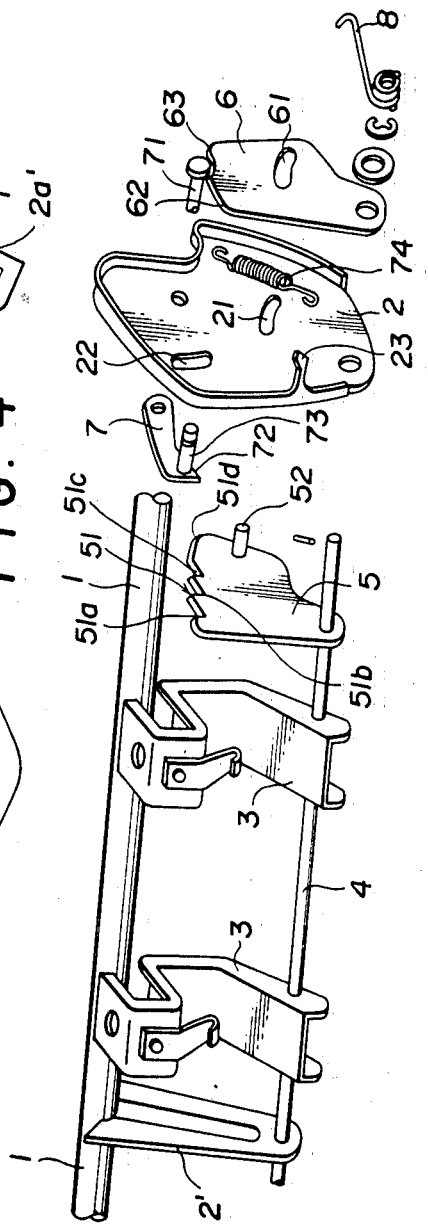
FIG. 4 is an exploded, perspective view of the same.

FIG. 3 shows the internal structure of the top portion of the seat back (b) and FIG. 4 illustrates an exploded perspective view of the same. The head-rest body (a) is structured such that stays (a1)(a1) provided integral with the head-rest body (a) are inserted into support members (3)(3) in such a manner to permit height adjustment of the head-rest body (a). In FIG. 3, (31) designates a plate spring which biases each of the side walls of the stays (a1)(a1) elastically so as to restrict the vertical shift movements of the stays (a1)(a1).

Support members (3)(3) for supporting the head-rest body (a) are fixedly mounted to a shaft of rotation (4) and this shaft of rotation (4) is extended between right and left brackets (2)(2′) fixed to a seat back frame (1), so that the support members (3)(3) can be rotated about the shaft of rotation (4). Also, a locking plate (5) is integrally fixed to the shaft of rotation (4) adjacent to the bracket (2) so that this lock plate (5) can be rotated along with the support members (3)(3).

Lock plate (5) is a generally triangular plate member with its bottom end being fixed to the shaft of rotation (4). Lock plate (5) is formed along its top edge with a plurality of substantially V-shaped locking grooves (51)(51) and is also provided with a lock release pin (52) extending from its side wall on the side of the bracket (2). This pin (52) is inserted into a larger elongated slot (21) provided in the bracket (2) and a smaller elongated slot (61) formed in a return plate (6), both of which will be explained later. The plural locking grooves (51) include a rear-most locking groove (51a) serving as a nuetral position, first and second locking grooves (51b)(51c) provided forwardly of the rear-most groove (51a), and a lock release/return start projection (51d) formed in succession with the second locking groove (51c).

The bottom end of bracket (2) is fixed to the seat frame (1) by welding or the like while the shaft of rotation (4) is rotatably extended through the top end of bracket (2). Bracket (2) also includes a large-sized elongated slot (21) formed in its side wall through which the lock release pin (52) is inserted, and serves to pivotally mount the bottom end of a stopper (7) which is engageable with the locking groove (51) in the lock plate (5) by means of a pin (71) in such a manner that the stopper (7) is free to rotate. Stopper (7) is formed at its tip end with a click-like engagement portion (72) for engagement with said locking groove (51) and is also provided with an engagement pin (73) on its side surface adjacent to the engagement portion (72). This engagement pin (73) is inserted through the large elongated slot (22) in the bracket (2) and a spring (74) is extended between the tip end of the engagement pin (73) and the projection (23) of the bracket (2). The tensile force of spring (74) biases the engagement portion (72) of the stopper (7) into engagement with the locking groove (51) in the lock plate (5). In the drawings, (8) designates a return spring extended over the bracket (2) and the shaft of rotation (4).

Return plate (6), which constitutes the lock release mechanism (6)(73)(52), is rotatably mounted to the shaft of rotation (4), and defines a small-sized elongated slot (61) smaller than the large-sized elongated slot (21) of the bracket (2) in such a position so as to correspond to the large-sized elongated slot (21)(that is, on the same circle about the shaft of rotation), and is rotated (by means of the pin (52) of the lock plate (5) inserted through the small-sized elongated slot (61)) when the lock plate (5) is rotated forwardly, i.e., in a direction from the neutral position (51a) to the lock release/return start projection (51d). The return plate (6) is also formed with a sliding portion (62), i.e., an inclined edge which is brought into contact with the pin (52) when the stopper (7) is engaged with the locking groove (51c) of the lock plate (5), and includes an engaging step portion (63), i.e., a recessed edge which is connected to the sliding portion (62).

The operation of the head-rest of the invention will be described below with reference to FIGS. 5(A), (B), (C), (D), and (E).

FIG. 5(A) shows the state in which the head-rest body (a) is in its neutral position. In this state, the stopper (7) is engaged into the locking groove (51a) of the lock plate (5), such engagement being maintained by the spring (74). On the other hand, the return plate (6) is free to rotate because the pin (52) is situated rearwardly of the large-sized elongated slot (21). Next, when the head-rest body (a) is pushed forward, the shaft of rotation is rotated. With this rotation of the shaft of rotation (4) the lock plate (5) is also rotated so that the stopper (7) is engaged into the locking groove (51b) of the lock plate (5). As the result of this, the head-rest body (a) is moved forward into the first locking groove, i.e., its first locked position.

In this state, since the pin (52) of the lock plate (5) is located generally centrally of the large-sized elongated slot (21), the return plate (6) is free to rotate (FIG. 5(B)). When the head-rest body (a) is further pushed forward, it is moved into its second forward position and the pin (52) is situated in the fore-most position of the larger elongated slot (21), so that the sliding portion (62) of the return plate (6) is brought into contact with the pin (73) of the stopper (7) by means of the pin (52), (FIG. 5(C)).

Then, when the head-rest body (a) is pushed forward further, the stopper (7) is engaged with the lock release/return start projection (51d) of the lock plate (5) and also pushes the return plate (6) by means of the pin (52), while the pin (73) of the stopper (7) goes beyond the sliding portion (62) into the engaging step portion (63). In this state, therefore, the stopper is released from its engagement, i.e., locked position, so that the head-rest rest body (a) is free to move forwardly and rearwardly (FIG. 5(D)).

When the head-rest body (a) is then moved backward into its neutral position, the return plate (6) is caused to move by means of the pin (52) (FIG. 5(E)) since the small-sized elongated slot (61) of the return plate (6) is shorter than the large-sized elongated slot (21) of the bracket (2) and the pin (73) is removed from the engaging step portion (63), so that the stopper is engaged into the locking groove (51a) of the lock plate (5), i.e., it is locked in this position.

Since the head-rest of the invention is constructed in the manner mentioned hereinbefore, it can be moved fore and aft, i.e., longitudinally of the vehicle without changing its height, unlike the prior art head-rest. Thus, as there is no need for adjustment of its height, the present invention is easy and quick to operate. Also, the present invention is simpler in structure and less expensive than the conventional one. In addition, since the center of rotation of the head-rest of the invention is situated within the seat back, the invention can retain the advantages that the prior art head-rest has, such as a wide range of longitudinal movement and no need for a lock release lever.

What is claimed is:

1. A head-rest for a vehicle seat wherein stays of a head-rest body are pivotally mounted to a seat back frame so as to permit the head-rest to be pivotally moved longitudinally of the vehicle, said head-rest comprising:

mounting brackets associated with said seat back frame of said vehicle seat and defining a large-sized elongated slot;

a rotation shaft rotatably mounted to said back frame through said bracket;

a lock plate fixed to said shaft and defining a plurality of locking grooves;

support means fixed to said shaft for supporting said stays of said head-rest body;

said lock plate and support means thereby being rotated when said shaft rotates;

said bracket including a stopper selectively engageable with said locking grooves defined in said lock plate; and, lock release means rotatably mounted to said shaft to release the engagement of said stopper with said locking grooves, said lock release means including (a) a return plate rotatably mounted to said shaft on an opposite side of said lock plate relative to said bracket and defining an engaging step portion and a small-sized elongated slot in registry with said large-sized elongated slot;

(b) said stopper including a first pin engageable with said engaging step portion of said return plate; and (c) a second pin provided on a side surface of said lock plate and inserted through said large-sized and small-sized elongated slots.

2. The head-rest as in claim 1, wherein an edge of said return plate is formed with an inclined portion which is brought into contact with said first pin when said stopper is engaged with a predetermined one of said locking grooves and wherein said engaging step portion adjoins said inclined portion, whereby when said first pin of said stopper is engaged with said engaging step portion said stopper is disengaged from said locking grooves of said lock plate.

3. The head-rest as in claim 1, wherein said lock plate is free to rotate in one direction when said stopper is engaged with a predetermined one of said locking grooves.

4. The head-rest as in claim 1, further comprising bias means for biasing said stopper in a direction toward said locking grooves of said lock plate.

5. The head-rest as in claim 1, wherein said rotation shaft is biased by a return spring to rotate in one direction.

6. The head-rest as in claim 1, wherein said bracket is fixed at its upper end to said back frame.

7. The head-rest as in claim 1, wherein said mounting brackets include means to couple said stays to said mounting brackets to permit vertical adjustments of said stays relative to said mounting brackets.

8. A device to permit pivotal adjustment of a head-rest of a vehicle seat comprising:

support means for supporting said head-rest;

shaft means rigidly connected to said support means for establishing a pivot axis about which said support means, and thus said head-rest, rotate in first and second opposite rotational directions;

lock plate means rigidly connected at one end to said shaft means so that said lock plate means rotates in said first and second opposite directions concurrently with the rotation of said shaft means, and defining at the other end thereof plural engagement grooves each establishing a respective angular adjustment position of said head relative to said vehicle seat, a first one of said engagement grooves and a last one of said engagement grooves respectively establishing start and ending angular positions of said head-rest relative to said vehicle seat;

stopper means including an engagement portion and means to mount said stopper means for pivotal movements between an engaged position wherein said engagement portion is engaged with a respective one of said engagement grooves, and a disengaged position wherein said engagement portion is disengaged from said engagement grooves; and lock release means for moving said stopper means into said disengaged position to thereby responsively disengage said engagement portion and said engagement grooves to permit said head-rest to be freely pivotal in said second direction from said ending position to said start position and for moving said stopper means from said disengaged position to said engaged position in response to said head-rest reaching said start position, said lock release means including:

(a) return plate means pivotally mounted to said shaft means for pivotal movements in said first and second opposite directions independently of the rotation of said shaft means and thus independently of said lock plate means, an edge of said return plate means defining a recessed surface;

(b) pin means rigidly fixed to said stopper means and engageable with said edge of said return plate means and with said recessed surface; and (c) coupling means operatively coupling said lock plate means and said return plate means for (i) permitting said lock plate means to be pivoted independently of said return plate means when said lock plate means is rotated in said one direction between said start and ending angular positions of said head-rest, (ii) engaging said return plate means upon said head-rest reaching said ending position such that said lock plate means and said return plate means together rotate in said one direction upon continued pivotal movement of said head-rest beyond its ending position to thereby cause said pin means to be engaged with said recessed surface of said return plate means to move said stopper means into said disengaged position, (iii) then subsequently permitting pivotal movement of said lock plate means in said second direction independently of said return plate means while said pin means is engaged with said recessed surface thereby permitting said head-rest to freely pivot, in said second direction from said ending position and into said start position, and (iv) engaging said return plate means when said pin means is engaged with said recessed surface during pivotal movement of said lock plate means in said second direction in response to said head-rest reaching an intermediate location prior to said start position, said lock and return plate means thereby together rotating in said second direction such that upon continued rotation thereof in said second direction beyond said intermediate location towards said start position, said pin means is released from engagement with said recessed surface to thereby cause said stopper means to move to said engaged position whereby said engagement portion is engaged with said first one of said engagement grooves.

9. A device as in claim 8 wherein said coupling means includes a slot defined in said return plate means having first and second opposing ends, and a pin fixed to said lock plate means and slidably mounted in said slot to engage said first and second ends in respective response to said head-rest being pivoted in said one direction beyond said ending position and in said second direction beyond said intermediate location.

10. A device as in claim 8 further comprising biasing means for biasing said stopper means into said engaged position.

* * * * *